Aug. 28, 1962 G. D. SMITH 3,051,944

ELECTRONIC SIREN AND COMMUNICATION APPARATUS

Filed Aug. 25, 1958 2 Sheets-Sheet 1

INVENTOR.
GERALD D. SMITH.

BY Lockwood, Galt, Woodard & Smith,
ATTORNEYS.

ELECTRONIC SIREN AND COMMUNICATION APPARATUS

Filed Aug. 25, 1958 2 Sheets-Sheet 2

INVENTOR.
GERALD D. SMITH.

BY Lockwood, Galt, Woodard + Smith
ATTORNEYS.

United States Patent Office 3,051,944

Patented Aug. 28, 1962

3,051,944
ELECTRONIC SIREN AND COMMUNICATION APPARATUS

Gerald D. Smith, Indianapolis, Ind., assignor to Auto-Electronics, Incorporated, Indianapolis, Ind., a corporation of Indiana Filed Aug. 25, 1958, Ser. No. 756,994
6 Claims. (Cl. 340—384)

This invention relates generally to electronic siren apparatus for police vehicles and the like, and in particular to an electronic siren apparatus having a flexibility permitting it to function also as an amplifier of incoming radio messages and as a public address system.

Conventional mechanical sirens utilized on police vehicles, ambulances and the like are characterized by the relatively high power input required for proper operation. Operation of the siren for prolonged periods tends to deplete the storage battery of the vehicle and overloads the vehicle electrical system. Sirens which produce the required audio oscillations electronically are not unknown in the prior art, however, they are characterized by substantial power input and consequently the relatively large amount of heat generated by their electrical circuit components. Since heat has a particularly deleterious effect on the operation of transistors, electronic siren apparatus using transistor circuits have in the past required some means for dissipating the heat produced in the apparatus during its operation. One solution offered for this problem has been the separation of the control panel from the oscillator and amplifier circuit components, the circuit components being mounted in a housing having heat exchange fins or surfaces thereon and the housing being mounted somewhere in the vehicle slip stream. This arrangement tends to limit the temperature rise of the circuit components. The inconvenience and maintenance difficulty involved in thus mounting the circuit component housing in a relatively inaccessible location and in providing wiring between the circuit component housing and control panel, accessible at the vehicle dashboard, are, of course, obvious.

The apparatus of the present invention utilizes a transistor-type siren oscillator circuit which may be manually controlled or automatically controlled by a siren oscillator control comprising conventional, transistor-type, multivibrator circuit. The output of the siren oscillator is fed to a transformer coupled amplifier and from the output stage of the amplifier directly to a speaker having a capacity sufficient to utilize the full output of the amplifier. Control switching means is provided which further permits the amplifier and speaker components to be utilized as a public address system or as an amplifier for incoming radio messages received by the vehicle's conventional radio receiver. A modified form of the oscillator is particularly adapted for use as a plug-in unit for conventional public address systems to provide a warning siren whereby existing public address installations may be utilized as an air raid warning system, a fire alarm system, or the like.

It is an object of the present invention to provide a transistor-type electronic apparatus charcterized by a relatively low operational temperature rise and, therefore, requiring no heat dissipating members located in the vehicle slip stream.

It is a further object of the present invention to provide an electronic apparatus adapted to closely simulate the sound produced by a coaster or mechanical siren and having quick pick-up long roll and instant brake action.

It is a further object of the present invention to provide an electronic siren apparatus which is small and relatively light in weight and requires a minimum of mounting space in a vehicle interior.

It is a further object of the invention to provide an electronic circuit apparatus having a unitary design wherein the control panel and amplifier are assembled in a single housing.

It is a further object of the present invention to provide an electronic siren apparatus characterized by low power consumption both during operation and in standby condition.

It is a further object of the present invention to provide an audio oscillator circuit which may be conveniently assembled with its battery-type power source in a single housing, thereby providing a plug-in unit for converting existing public address systems into alarm systems.

The full nature of the invention will be understood from the accompanying drawings and the following description and claims:

Figures 1, 3:
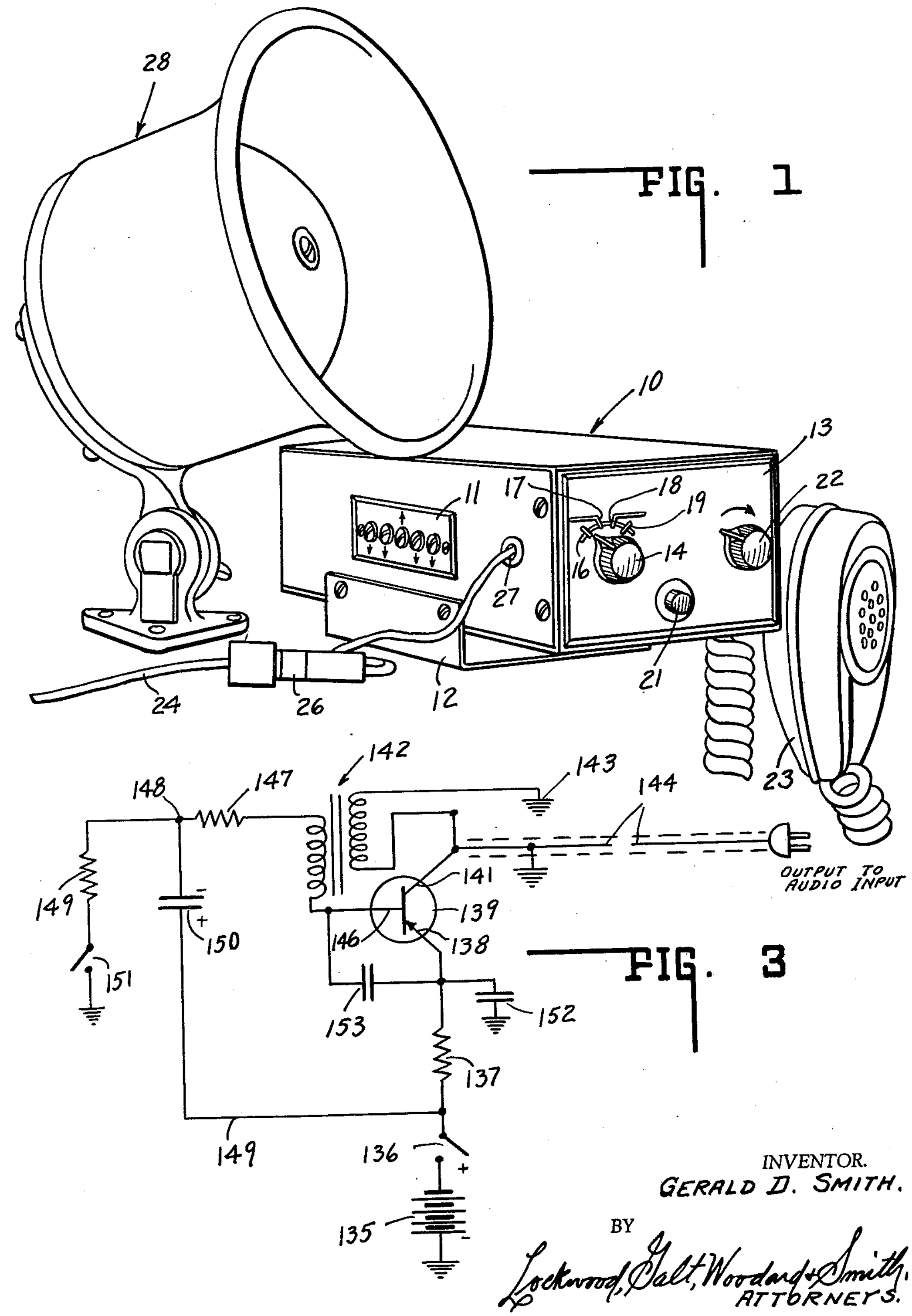
FIG. 1 is a perspective view of the basic components making up the apparatus of the present invention.
FIG. 3 is a schematic circuit diagram of a modified form of the audio oscillator circuit.

Referring initially to FIG. 1, there is shown generally at 10 a circuit component housing. The housing is provided on one side panel with a terminal board 11 having terminal screws thereon accommodating wiring to be subsequently described with reference to FIG. 2. The housing is further provided with a mounting bracket 12 and at one end face carries a control panel 13. The control panel has extending therefrom the operating knob 14 of a selector switch. Index markings on the panel adjacent the knob 14 provide an "off" position 16, a "manual" position 17, an "automatic" position 18 and a "radio" position 19. The control panel further mounts the push button operator 21 for a manual siren switch which will be subsequently referred to with reference to FIG. 2. A volume control knob 22 also extends from the control panel and provides a means for adjusting the voice volume under certain conditions of operation of the apparatus.

A hand microphone 23 is connected to the circuit components within the housing, and is provided with a hand switch (not visible in FIG. 1). A power lead 24 is connected to a main fuse 26 and extends through the grommeted aperture 27 in the housing. The output of the system is supplied to a speaker of conventional outdoor type indicated generally at 28.

Figure 2:
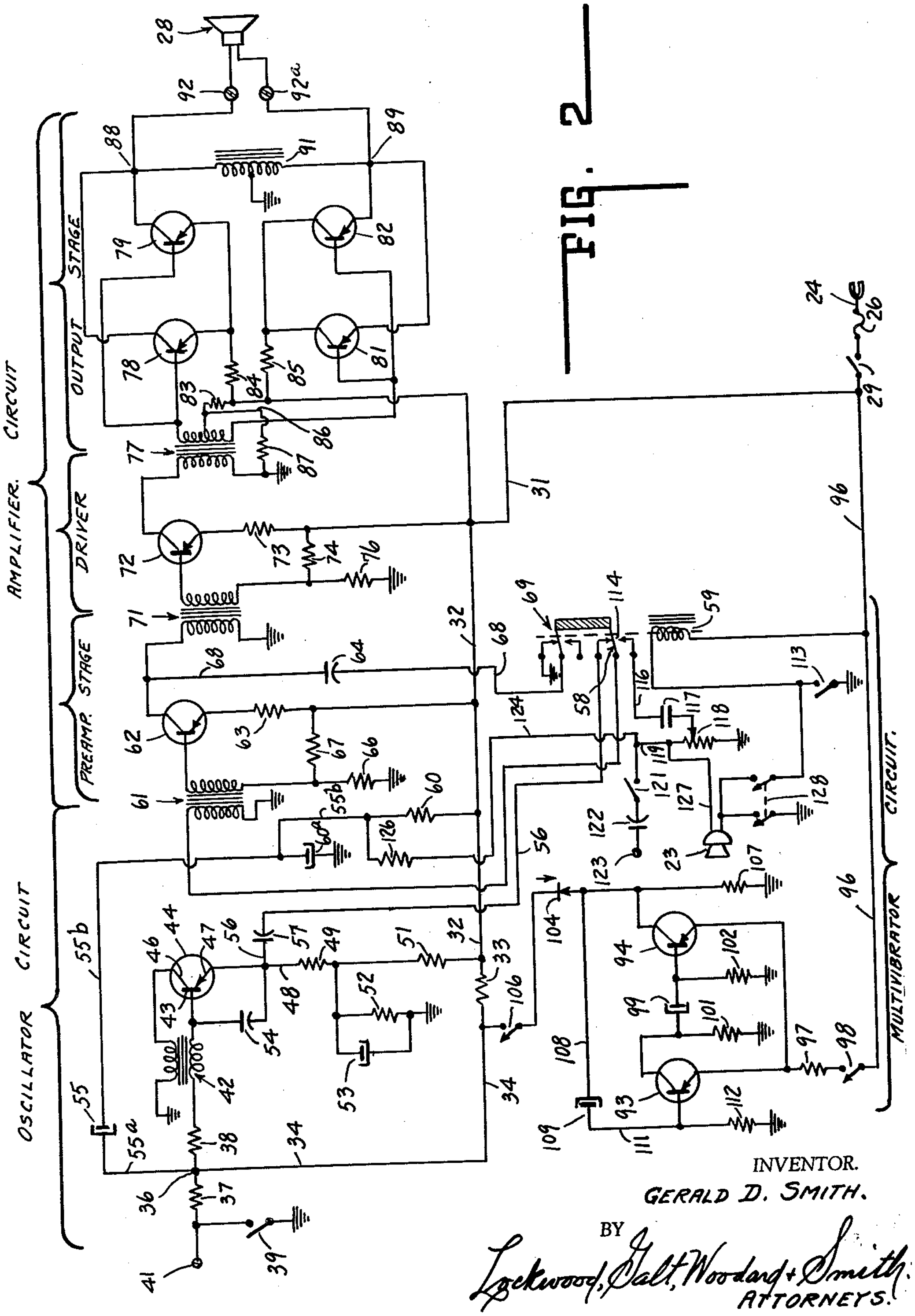
FIG. 2 is a schematic circuit diagram of the apparatus of the present invention.

Referring to FIG. 2, the circuit and operation of the apparatus of the present invention will now be described. In the form of the apparatus utilized in automobiles or the like, the power lead 24 is connected to the positive side of the conventional 12 volt auto battery. The other side of the fuse is connected to a switch 29 which is moved to closed position when the knob 14 is moved away from its "off" position. A wire 31 is connected to the positive bus wire 32 which, in turn, is connected to one side of an impedance in the form of resistor 33 which has a relatively high ohmic resistance. The other side of the resistor is connected by a wire 34 to the junction 36 of two resistors 37 and 38. The other side of the resistor 37 is connected to one side of a manual siren switch 39 having its other side connected to ground and thus to the negative side of the auto battery or power source. The switch 39 may be momentarily closed by depressing the push button 21 shown in FIG. 1. An auxiliary switch terminal 41 is also provided so that additional switches, such as a foot-operated switch, might also be connected in parallel to the manual siren switch 39.

The side of the resistor 38 remote from the junction 36 is connected to a winding of an oscillator transformer 42, this winding being further connected to the base 43 of a PNP transistor 44. The collector 46 of the transistor is connected to the input winding of the oscillator transformer 42, the other end of this winding being grounded. The transistor emitter 47 is connected by means of a wire 48 to the wire 32 with resistors 49 and 51 serially interposed therebetween. A conventional filtering and stabilizing circuit network, comprising resistor 52 and capacitor 53, is connected to wire 48 and to ground. A capacitor 54 is connected across the base and emitter of the transistor 44 and serves to place a limit on the low frequency oscillations produced by the oscillator circuit so that the speaker will not be damaged. A wire 55*a* joins the junction 36 with a capacitor 55 and a wire 55*b* joins the opposite side of the capacitor to the power lead 32 through a filter resistor 60. A filter capacitor 60*a* couples the wire 55*b* to ground.

The output lead 56 of the oscillator circuit has interposed therein a filtering condenser 57 and a normally closed switch 58, operated to open position upon energization of the relay coil 59. From the switch 58 the output of the oscillator circuit is introduced by means of the input transformer 61 to the preamplifier stage of a conventional, transformer-coupled amplifier. The amplifier circuit, except for the output stage is of conventional design and will not be described in detail herein. In general it includes a preamplifier stage comprising a transistor 62 having its base coupled to the input transformer 61. The emitter resistor 63 joins the transistor emitter to the power supply wire 32. The secondary of the input transformer is connected through resistor 66 to ground and by means of resistor 67 to the junction of resistor 63 and wire 32. A wire 68 has interposed therein condenser 64 and connects the transistor collector to ground through the manually closed switch 69 operated by the relay coil 59.

The output of the transistor 62 is coupled to the driver stage by means of the coupling transformer 71. This stage includes a transistor 72 and resistances 73, 74 and 76 similar to resistors 63, 66 and 67, respectively, which were previously referred to with reference to the preamplifier stage.

The output of the driver is coupled to the output amplifier stage by means of the center tapped coupling transformer 77. As may be seen from FIG. 2, the amplifier output stage includes transistors 78, 79, 81 and 82 which are coupled to the secondary of transformer 77 in parallel connected push-pull configuration. The circuit further includes resistors 83, 84 and 85. A wire connects the center-tap of the transformer secondary to ground through the resistor 87. This connection provides a feed-back of current to ground and improves the voice quality of the speaker output as required under certain conditions of operation of the apparatus. The output of the push-pull, parallel-connected transistor circuit appears at junctions 88 and 89 which are coupled through the center-tapped reactor 91 to ground. The junctions 88 and 89 are connected by means of terminals 92 and 92*a* to the speaker 28.

It will be noted that the use of parallel-connected transistors in push-pull configuration in the output stage permits relatively low current flow through each transistor and therefore permits the transistors to operate with a relatively low temperature rise. The arrangement also permits the direct coupling of the speaker 28, a preferred form of which has a 16 ohm impedance, to the output junctions 88 and 89. The natural impedance of the push-pull, parallel-connected transistor configuration permits the output of the amplifier to be directly coupled to the speaker without the use of a conventional output transformer increasing the efficiency of the circuit and limiting the drain on the battery or power source when the apparatus is in operation.

The means for automatically operating the oscillator circuit so as to produce the repeat siren signal independently of the manual switch 39 includes a transistor type oscillator control circuit. The control circuit is essentially a conventional multivibrator switching circuit. The multivibrator circuit includes transistors 93 and 94 which have their emitters connected to the positive side of the power source by means of a power lead 96. A resistor 97 and a siren switch 98 are serially interposed between the wire 96 and transistor emitters. The switch 98 is operated to closed position whenever the knob 14 on the control panel is moved to "automatic" position indicated at 18 in FIG. 1. The transistors are emitter-coupled, the collector to base circuit between the transistors 93 and 94 having interposed therein a capacitor 99 and resistors 101 and 102. The collector of the transistor 94 is connected to a wire 103 which, in turn, is connected through the diode 104 and the switch 106 to the wire 34 of the oscillator circuit. The wire 103 extends to ground through resistor 107, and by means of a wire 108 is connected to one side of a capacitor 109. The opposite side of capacitor 109 is connected by means of wire 111 to the base of transistor 93 and is connected to ground through the resistor 112.

The switch 106 controlling the connection between the multivibrator circuit and the oscillator circuit is operated to closed position in unison with the switch 98 whenever the knob 14 of FIG. 1 is moved to its "automatic" position.

The multivibrator circuit operates in conventional fashion, the details of operation being therefore omitted herein. In general, it may be pointed out that the multivibrator circuit produces a square wave voltage output, the circuit components, including capacitor 109, being sized so that, with switch 106 closed, current may flow through the diode 104 from the wire 34 for a time interval of the order of two seconds, with current flow in the reverse direction being prevented by the diode for a time interval of the order of seven seconds, with the cycle repeating itself as long as the switches 98 and 106 are closed.

The apparatus of the present invention provides circuit means for interrupting the output of the oscillator circuit and transferring to the amplifier an input originating either either from the hand microphone 23 or a conventional radio receiver. This circuit includes the relay coil 59 connected across the power source through a switch 113 which is closed whenever the knob 14 of FIG. 1 is placed in "radio" position, indicated at 19 in FIG. 1. Energization of relay coil 59 serves to open the switch 69, breaking the circuit to condenser 64. Energization of the relay coil further functions to open switch 58, disconnecting the oscillator circuit from the amplifier circuit, and also closes switch 114. Closure of the normally open side of switch 114 connects the amplifier input lead to the wire 116, which, in turn, is connected through capacitor 117 to the wiper arm of potentiometer 118 which serves as a volume control. The knob 22 of FIG. 1 operates the wiper arm over the potentiometer resistance and serves to vary the resistance in the circuit to the amplifier through the switch 114. A wire 119 connects the potentiometer to one side of a switch 121 having its opposite side connected through capacitor 122 to a terminal 123. The terminal 123 is adapted to have connected thereto the ungrounded side of the output of a conventional communications type radio receiver. The switch 121 is closed in unison with the switch 113 when the knob 14 is moved to "radio" position. A wire 124 joins wires 119 and 55*b* through a resistor 126.

The voice microphone 23 is connected to the amplifier input by means of wire 127. The double-pole, single-throw microphone hand switch 128 serves to connect the relay coil 59 to the negative side of the source of power whenever the switch is closed. Thus, whenever the switch 128 is manually closed, the relay coil 59 is energized to connect the microphone to the amplifier input circuit.

A listing of the preferred values and identification numbers for the various circuit components is set out below:

| | | |
|---|---|---|
| Transistor 44 | | 2N382 |
| Transistor 62 | | 2N383 |
| Transistor 72 | | 2N380 |
| Transistor 78 | | 2N379 |
| Transistor 79 | | 2N379 |
| Transistor 81 | | 2N379 |
| Transistor 82 | | 2N379 |
| Transistor 93 | | 2N382 |
| Transistor 94 | | 2N382 |
| Capacitor 53 | mfd | 500 |
| Capacitor 54 | mfd | .05 |
| Capacitor 55 | mfd | 250 |
| Capacitor 57 | mfd | .5 |
| Capacitor 60*a* | mfd | 250 |
| Capacitor 64 | mfd | .1 |
| Capacitor 99 | mfd | 100 |
| Capacitor 109 | mfd | 100 |
| Capacitor 117 | mfd | 4 |
| Capacitor 122 | mfd | .01 |
| Resistor 33 | kilohms | 100 |
| Resistor 37 | ohms | 2700 |
| Resistor 38 | kilohms | 15 |
| Resistor 49 | ohms | 2200 |
| Resistor 51 | do | 15 |
| Resistor 52 | do | 100 |
| Resistor 60 | do | 47 |
| Resistor 63 | do | 100 |
| Resistor 66 | do | 330 |
| Resistor 67 | do | 10 |
| Resistor 73 | do | 1 |
| Resistor 74 | do | 15 |
| Resistor 76 | do | 270 |
| Resistor 83 | do | 1 |
| Resistor 84 | do | .27 |
| Resistor 85 | do | .27 |
| Resistor 87 | do | 100 |
| Resistor 97 | do | 1000 |
| Resistor 101 | do | 2700 |
| Resistor 102 | kilohms | 22 |
| Resistor 107 | ohms | 6800 |
| Resistor 112 | kilohms | 100 |
| Resistor 118 | do | 10 |
| Resistor 126 | ohms | 330 |
| Diode 104, germanium diode | | 1N290 |

In operation, with the knob 19 in "manual" position, the transistor 44 in the oscillator circuit is biased to "off" position, that is, the voltage of the junction 36 is sufficiently positive to render the transistor non-conductive. In this quiescent state the oscillator circuit therefore requires no significant power output from the power source. When the push button switch 39 is momentarily closed, because of the impedance of resistor 33, the voltage at junction 36 immediately drops, causing the base of the transistor 44 to swing negative, rendering it conductive. After switch 39 is reopened, the junction 36 again tends to become more positive, however, this positive swing is delayed by the discharging of capacitor 55. At the termination of a time interval dependent upon the relation between the capacity of capacitor 55 and the resistance of resistor 33, the junction 36 will again attain a positive potential sufficient to cut off transistor 44. During the interval in which the transistor is conductive, a single siren signal of ascending and subsequently descending frequency will be fed into the amplifier circuit and to the speaker 28. In order to prevent the speaker 28 from reproducing a signal having a frequency low enough to damage the speaker, the capacitor 54 provides a feedback which blocks the oscillator circuit output, that is, cuts off transistor 44, when its output frequency approaches approximately 200 cycles per second.

While the manual switch 39 provides a single siren signal whenever the switch is closed, by moving the knob 14 to "automatic" position the multivibrator circuit may be utilized to provide a repeated siren signal. When the knob 14 is moved to "automatic" position, the switches 98 and 106 are closed, causing the multivibrator circuit to produce the stepped voltage which permits current flow through the diode 104 for a period of approximately two seconds, the reversal of current flow through the wire 103 for the ensuing seven seconds being prevented by the diode 104. It will thus be apparent that for the period during which current may flow through the diode 104, the junction 36 and consequently the base of the transistor 44 will be swung negative sufficient to render the transistor conductive to provide a siren signal. During the interval wherein the diode cannot pass current, the junction 36 will swing positive, with this change being delayed by the discharge by capacitor 55, thereby providing the descending frequency portion of the siren signal. The siren signal is thus repeated, cyclically, as long as the knob 14 is maintained in "automatic" position. It should be noted that when the knob 14 is shifted from "automatic" position to "manual" position, the siren signal will not be abruptly interrupted, but will, because of the action of capacitor 55, maintain the siren signal through the descending frequency portion of its cycle. This action more accurately simulates the sound produced by the coasting or slowing of a conventional mechanical siren.

In the event that the occupants of a police vehicle, ambulance or the like might wish to leave the vehicle and yet retain radio contact, the knob 14 may be moved to "radio" position. This closes switches 113 and 121, energizing relay 59 and shifting the amplifier input to the incoming radio signal provided at terminal 123. By properly adjusting the volume control knob 22, any incoming radio signal will be amplified and reproduced at speaker 28 in sufficient volume to be heard even at a considerable distance from the vehicle.

When knob 14 is on either "manual,""automatic" or "radio" position, the microphone hand switch 128 may be closed to render the microphone 23 live so that verbal warning signals, or the like may be reproduced at the speaker. The volume control provided by potentiometer 118 may be used to adjust the voice volume when the speech switch 128 is closed. It should be noted that the connections are such that closure of switch 128 energizes relay coil 59 no matter which position the selector knob 14 may happen to be in, the microphone thus being enabled to override any other signal which is then being reproduced at the speaker.

From the foregoing it should be apparent that the apparatus of the present invention provides an electronic siren which closely simulates the sound of a conventional coaster siren. The apparatus is compact and light in weight and may be installed in the minimum of mounting space. The control panel and amplifier are mounted as a compact unit, the control panel being thereby readily accessible and the circuit components being accessible for replacement or repair. Because of the relatively low temperature rise of the circuit components the unit does not require air cooling and therefore need not be mounted in a vehicle slip stream, but can be mounted wherever convenient in the interior of the vehicle. The unit is characterized by relatively low current consumption, requiring a maximum of three amperes at 12 volts in full operation. In the quiescent state, its current consumption is less than one ampere at 12 volts. Because the control panel and circuit components are combined in one housing, no connecting cables need be used and extensive wiring connections need not be made between the control panel and the amplifier.

Referring now to FIG. 3 a modified form of the oscillator circuit will be described. The circuit therein shown has essentially a grounded emitter configuration and is connected to a source of D.C. power 135 which may take the form of a nine volt battery. The negative side of the power source is grounded and the positive side is connected through main switch 136 and resistor 137 to the emitter 138 of a PNP type transistor 139. The collector 141 is connected to one winding of an oscillator transformer 142, the other side of the winding being grounded at 143. The collector is further joined to the shielded output lead 144 which is adapted to be connected to the audio input of, for example, an existing public address system.

The base 146 of the transistor is connected to the other winding of transformer 142 and through resistor 147 to junction 148. A wire 149 connects the positive side of the power source to one side of capacitor 150, the other side of the capacitor being connected to the junction 148. The junction 148 is further connected through resistor 149 to one side of the push-button operated switch 151, the other side of switch 151 being grounded. A capacitor 152 is connected between the transistor emitter and ground. Capacitor 153 is connected across the base and emitter of the transistor and serves the same purpose as capacitor 54 in FIG. 2.

A list of values and identification numbers for the electrical components of the circuit of FIG. 3 are set out below:

| | |
|---|---|
| Resistor **137** ----------ohms-- | 270 |
| Resistor **147** ----------kilohms-- | 22 |
| Resistor **149** ----------do-- | 33 |
| Capacitor **150** ----------microfarads-- | 100 |
| Capacitor **152** ----------do-- | .1 |
| Capacitor **153** ----------do-- | .05 |
| Transistor **139** ---------- | 2N382 (PNP) |

In operation, with switch 136 closed and switch 151 open, the transistor 139 will be voltage biased to cutoff. When push button switch 151 is momentarily closed, the transistor base is swung negative rendering transistor 139 conductive and providing a signal output at the output lead 144. During the interval when the switch 151 is closed the capacitor 150 acquires a charge, and upon opening of switch 151, the equalization of the voltage across capacitor 150 delays the positive swing of the transistor base to provide a complete siren signal before the transistor is cut off.

The oscillator circuit of FIG. 3 may have its components mounted in a relatively small housing with the push button operator for switch 151 mounted thereon. The self-contained oscillator unit may thus be conveniently utilized with an existing audio amplifying system. It has relatively low stand-by current of approximately .28 milliamp. and an operating current of approximately 2.1 milliamps.

It will be understood that by suitably altering the oscillator circuit of FIG. 3, or by altering the oscillator and oscillator control circuit of FIG. 2, a bell tone or horn tone, such as conventionally used aboard ships, might be produced in place of the siren signal herein described.

While the invention has been disclosed and described in some detail in the drawings and foregoing description, they are to be considered as illustrative and restrictive in character, as other modifications may readily suggest themselves to persons skilled in this art and within the broad scope of the invention, reference being had to the appended claims.

The invention claimed is:

1. An electronic siren apparatus comprising a source of direct current power; a speaker adapted to provide an audio output; an audio oscillator circuit network including a PNP transistor and an oscillator transformer regeneratively coupling the collector of said transistor to its base to provide an oscillating output when said transistor is conducting; circuit means including a resistor connecting the positive side of said power source to the base of said transistor, a control switch adapted for momentary manual closure and connecting said transistor base to the negative side of said power source; closure of said control switch thereby lowering the potential of said transistor base to cause said transistor to conduct; a capacitor connected across said power source and in series with said control switch and adapted to be charged upon closure of said control switch, the discharge of said capacitor upon subsequent opening of said control switch thereby delaying the positive swing of said transistor base and consequently the cutoff of said transistor; a multistage amplifier accommodating the output of said oscillator circuit network, the output stage of said amplifier comprising two groups of parallel connected transistors arranged in push-pull relation with their output coupled directly to said speaker; an auxiliary connection between the base of said oscillator circuit transistor and the negative side of said power source; a multivibrator circuit network adapted when energized to sequentially permit and block current flow through said auxiliary connection; momentary closure of said control switch thereby providing a single siren signal to said speaker and energization of said multivibrator circuit network thereby provding automatically repeated siren signals to said speaker.

2. An electronic siren apparatus comprising a source of direct current power; a speaker adapted to provide an audio output; audio oscillator circuit network including a transistor and an oscillator transformer regeneratively coupling the collector of said transistor to its base to provide an oscillating output when said transistor is conducting; circuit means including a resistor connecting one side of said power source to the base of said transistor, a control switch adapted for momentary manual closure and connecting said transistor base to the other side of said power source; closure of said control switch thereby altering the potential of said transistor base to cause said transistor to conduct; a capacitor connected across said power source and in series with said control switch and adapted to be charged upon closure of said control switch, the discharge of said capacitor upon subsequent opening of said control switch thereby delaying the return of the potential of said transistor base to its original value and consequently the cutoff of said transistor; a multi-stage amplifier accommodating the output of said oscillator circuit network, the output stage of said amplifier comprising two groups of parallel connected transistors arranged in push-pull relation with their output coupled directly to said speaker; an auxiliary connection between the base of said oscillator circuit transistor and said other side of said power source; a multivibrator circuit network adapted when energized to sequentially permit and block current flow through said auxiliary connection; momentary closure of said control switch thereby providing a single siren signal to said speaker and energization of said multivibrator circuit network thereby providing automatically repeated siren signals to said speaker.

3. An electronic siren apparatus comprising a source of direct current power; a speaker adapted to provide an audio output; an audio oscillator circuit network including a transistor and an inductive coupling means regeneratively coupling the collector of said transistor to its base to provide an oscillating output when said transistor is conducting; circuit means including a resistor connecting one side of said power source to the base of said transistor, a control switch adapted for momentary manual closure and connecting said transistor base to the other side of said power source; closure of said control switch thereby altering the potential of said transistor base to cause said transistor to conduct; a capacitor connected across said power source and in series with said control switch and adapted to be charged upon closure of said control switch, the discharge of said capacitor upon subsequent opening of said control switch thereby delaying the return of the potential of said transistor base to its original value and consequently the cutoff of said transistor; a capacitor connected between the emitter and base of said transistor to provide a feedback cutting off said transistor when its output frequency reaches a predetermined minimum value; an amplifier accommodating the output of said oscillator circuit network, the output stage of said amplifier being coupled to said speaker; momentary closure of said control switch thereby providing a single siren signal to said speaker which is terminated as the signal frequency reaches a predetermined minimum value.

4. An electronic audio signalling apparatus comprising a source of direct current power; an electro-mechanical transducer adapted to provide an audio output; an audio oscillator circuit network including a transistor and an inductive coupling means regeneratively coupling the collector of said transistor to its base to provide an oscillating output when said transistor is conducting; circuit means including a resistor connecting one side of said power source to the base of said transistor, a control switch adapted for momentary manual closure and connecting said transistor base to the other side of said power source; closure of said control switch thereby altering the potential of said transistor base to cause said transistor to conduct; a capacitor connected across said power source and in series with said control switch and adapted to be charged upon closure of said control switch, the discharge of said capacitor upon subsequent opening of said control switch thereby delaying the return of the potential of said transistor base to its original value and consequently the cutoff of said transistor; a capacitor connected between the emitter and base of said transistor to provide a feedback cutting off said transistor when its output frequency reaches a predetermined minimum value; an amplifier accommodating the output of said oscillator circuit network, the output stage of said amplifier being coupled to said transducer; momentary closure of said control switch thereby providing a signal to said transducer having a duration determined by the relation between the impedance of said resistor and the capacity of said capacitor with the signal cut-off occurring as the signal frequency reaches a predetermined minimum value.

5. An electronic audio signaling apparatus comprising a source of direct current power; an electro-magnetic transducer adapted to provide an audio output; an audio oscillator circuit network including a transistor and an inductive coupling means regeneratively coupling the collector of said transistor to its base to provide an oscillating output when said transistor is conducting; circuit means including a resistor connecting one side of said power source to the base of said transistor, a control switch adapted for momentary manual closure to cause said transistor to conduct for a predetermined time interval, a capacitor connected between the emitter and base of said transistor to provide a feedback cutting off said transistor when its output frequency reaches a predetermined minimum value; an amplifier accommodating the output of said oscillator circuit network, the output stage of said amplifier being coupled to said transducer; momentary closure of said control switch thereby providing a signal to said transducer of predetermined duration with the signal cut-off occurring as the signal frequency reaches a predetermined minimum value.

6. An electronic audio signaling apparatus comprising a source of direct current power; an electro-mechanical transducer adapted to provide an audio output; an oscillator circuit network, a transistor and an inductive coupling means, the collector of said transistor being regeneratively coupled to its base by said coupling means to provide an oscillating output when said transistor is conducting; circuit means including a resistor connecting one side of said power source to the base of said transistor, a control switch adapted for momentary manual closure to cause said transistor to conduct for a predetermined time interval, means providing a feedback between the emitter and base of said transistor to cut off said transistor when its output frequency reaches a predetermined minimum value; means for connecting the output of said oscillator circuit network to the transducer; momentary closure of said control switch thereby providing a signal to the transducer of predetermined duration but terminating when the signal frequency reaches a predetermined minimum value.

References Cited in the file of this patent

UNITED STATES PATENTS

| | | |
|---|---|---|
| 2,548,235 | Olson | Apr. 10, 1951 |
| 2,576,585 | Fleming | Nov. 27, 1951 |
| 2,617,035 | Janssen et al. | Nov. 4, 1952 |
| 2,817,708 | Fender | Dec. 24, 1957 |

OTHER REFERENCES

Transistor, CKT Handbook, chapter 5, copyright 1956. Louis E. Garner, Jr., the Coyne Electrical School, Chicago 12, Illinois. Pages 77, 78 and 84 relied on.